United States Patent [19]

Lohmeijer et al.

[11] Patent Number: 4,654,400

[45] Date of Patent: Mar. 31, 1987

[54] POLYMER MIXTURE WITH POLYCARBONATE AND POLYESTER

[75] Inventors: Johannes H. G. M. Lohmeijer, Hoogerheide, Netherlands; Jean M. H. Heuschen, Schoten, Belgium

[73] Assignee: General Electric Company, Pittsfield, Mass.

[21] Appl. No.: 790,599

[22] Filed: Oct. 23, 1985

[30] Foreign Application Priority Data

Oct. 31, 1984 [NL] Netherlands .................... 8403295

[51] Int. Cl.$^4$ .............................................. C08L 51/00
[52] U.S. Cl. ........................................ 525/64; 525/67; 525/69; 525/902
[58] Field of Search ................ 525/67, 902, 64, 69, 525/148

[56] References Cited

U.S. PATENT DOCUMENTS

| 3,655,824 | 4/1972 | Kato et al. | 260/873 |
| 3,808,180 | 4/1974 | Hammann | 260/885 |
| 3,864,428 | 2/1975 | Nakamura et al. | 260/873 |
| 4,000,216 | 12/1976 | Lang | 260/857 |
| 4,034,013 | 7/1977 | Lane | 260/835 |
| 4,096,202 | 6/1978 | Farnham et al. | 260/873 |
| 4,180,494 | 12/1979 | Fromuth et al. | 260/40 R |
| 4,205,144 | 5/1980 | Naarmann et al. | 525/273 |
| 4,257,937 | 3/1981 | Cohen et al. | 260/40 R |
| 4,264,487 | 4/1981 | Fromuth et al. | 260/40 R |

FOREIGN PATENT DOCUMENTS 0107048 5/1984 European Pat. Off. .............. 525/67

Primary Examiner—Theodore E. Pertilla
Attorney, Agent, or Firm—Edward K. Welch, II; William F. Mufatti; Richard J. Traverso

[57] ABSTRACT

The properties of polymer mixtures which comprise an aromatic polycarbonate, an aromatic polyester and a core-shell polymer having an acrylate core, can be improved by using a core-shell polymer having a particle size of less than 0.2 micrometers.

6 Claims, No Drawings

POLYMER MIXTURE WITH POLYCARBONATE AND POLYESTER

The invention relates to a polymer mixture which comprises the following constituents:
(a) 30–70% by weight of aromatic polycarbonate;
(b) 20–60% by weight of aromatic polyester;
(c) 5–15% by weight of a polymer having an elastomeric core which comprises one or more alkyl acrylates or aralkyl acrylates, a cross-linking agent, and a grafting agent and having a rigid thermoplastic envelope.

Polymer mixtures which may comprise an aromatic polycarbonate, an aromatic polyester and a polymer with a rubber-like first phase and a rigid thermoplastic final phase, are described in WO No. 80/00972. The known mixtures have a good impact strength and a good tensile strength, in particular in comparison with a pure aromatic polyester. It has furthermore been found in practice that these known polymer mixtures have a good resistance to organic solvents, for example, motor spirit. The known polymer mixtures exhibit two small disadvantages: articles obtained by injection moulding show the tendency to a phenomenon which may be referred to as nacrous lustre. This means that these articles sometimes have a surface showing nacrous lustre. A second disadvantage is the occurrence of a discoloring of the surface (turning white) after contact with organic solvents, for example, motor spirit. For applications in which high requirements are imposed as regards the appearance of the formed articles, these two disadvantages make it necessary to provide the articles with a protective layer of lacquer.

The invention provides a new polymer mixture having the same good mechanical properties as the known polymer mixtures without the above-mentioned disadvantages occurring. The invention is based on the discovery that by a proper choice of the particle size of the polymer (c) the said disadvantages do not occur.

The polymer mixture according to the invention is characterized in that the polymer (c) has an average particle size of less than 0.2 micrometers. Particle size is always to be understood to mean the size as determined according to the method to be described hereinafter, in so far as at least not otherwise stated.

It is also contemplated that the use of polymer component (c) having an average particle size of less than 0.2 micrometers in a binary blend with either polycarbonate or aromatic polyester would also find utility and advantage. Such binary compositions would comprise 0.5–15% by weight of polymer(c) and 85–99.5% by weight of either aromatic polycarbonate or aromatic polyester.

The invention furthermore relates to polymer mixtures which comprise
(a) 85–99.5% by weight of aromatic polyester and
(b) 0.5–15%, by preference 10–15%, by weight of a polymer (c) as meant above having an average particle size of less than 0.2 micrometers.

The invention provides in particular polymer mixtures which comprise a polymer (c) as described in U.S. Pat. No. 3,808,180. The polymers described therein consist of a multiphase composite interpolymer having a first phase with a glass temperature of less than 10° C. This first phase has been obtained by polymerisation of at least approximately 50% by weight of one or more alkyl and aralkyl acrylates, approximately 0.05 to 5.0% by weight of a cross-linking monomer, approximately 0.05 to 5.0% by weight of a graft-linking monomer, approximately 0 to 10% by weight of a hydrophilic monomer and the remainder of further copolymerisable ethenically unsaturated monomers. As a cross-linking monomer is used a polyethenically unsaturated monomer having several groups which are reactive for addition polymerisation and which all react at approximately the same rate. The graft-linking monomer is a polyethenically unsaturated monomer having several groups which are reactive for addition polymerisation and at least one of which polymerises at a reaction rate which differs considerably from the reaction rate of at least one of the remaining reactive groups. The polymer (c) according to U.S. Pat. No. 3,808,180 furthermore comprises a final phase of a rigid thermoplastic material which is polymerised in the presence of the elastomeric phase mentioned hereinbefore from a monomer mixture consisting for at least for 50% by weight of an alkyl methacrylate. Between the elastomeric phase and the final phase an intermediate phase may be present, for example, an intermediate phase of styrene.

The polymer (c) as used in the polymer mixtures according to the invention may comprise in the elastomeric phase, for example, an n-butyl acrylate or a 2-ethylhexylacrylate. 2-Ethylhexylacrylate is to be preferred. When 2-ethylhexylacrylate is used in the elastomeric phase, a polymer (c) is obtained which, when used in the polymer mixtures according to the invention, leads to a polymer mixture having a particularly good resistance to petrol (substantially no discoloring). As a cross-linking monomer may be used polyacrylates or polymethacrylates of polyoles, for example butylene diacrylate. In the preparation of polymer (c) a graft-linking monomer is also used. Suitable graft-linking monomers are, for example, allylmethacrylate and allylacrylate. The elastomeric phase may comprise further copolymerisable monomers in addition to the above-mentioned alkylacrylate and/or aralkylacrylate and the said monomers. The rigid final phase may be built up from a $C_1$–$C_4$ alkylmethacrylate, for example, methylmethacrylate or also from a copolymer of styrene and acrylonitrile.

The preparation of polymer (c) is known per se. It is also known how a polymer (c) of a given particle size can be obtained. For this purpose, reference may be made to the above-mentioned U.S. Pat. No. 3,808,180 and to the article by J. Vandegaer in J.Appl.Pol.Sc. 9, 2929 (1965).

The way in which the particle size is determined and which size is meant (diamater or radius) or the way in which the size is calculated (average according to number or to volume) has not been indicated.

Assignee of U.S. Pat. No. 3,808,180 markets a product under the indication Acryloid KM 330 which falls within the scope of the said Patent Specification (for this purpose see, for example, European patent application No. 36 127 and implicitly WO No. 80/00972).

When the particle size of this product (Acryloid KM 330) is determined by means of a scanning electron microscope in the manner described hereinafter, a particle size of 0.46 micrometers is found.

The polymer (c) as described in U.S. Pat. No. 3,808,180 has already been used in the form of polymer mixtures with a poly(alkyleneterephtalate) (see U.S. Pat. No. 4,096,202), with a poly(carbonate) (EP No. 0.036.127), with a poly(alkyleneterephtalate) plus a poly(carbonate) (WO No. 80/00972 and EP No.

0,025,920). The particle size of the polymer (c) used is not indicated anywhere; usually it is stated that the commercial product Acryloid KM 330 is used as a polymer (c).

The found relationship between the particle size and the occurrence of nacrous lustre and the occurrence of white spots after contact with organic solvents could not be predicted. The association between these factors is not known either for similar polymers.

Determination Particle Size.

In so far as not stated otherwise in this application and in the claims, particle size of polymer (c) is always to be understood to mean the dimension determined as follows. In preparing polymer (c) a latex is obtained from which polymer (c) is recovered. For the determination of the particle size this latex is used as the starting material. This latex is centrifuged in a highly diluted form by means of an analytic centrifuge (type CAPA 500 of Horiba, Japan). The size of the sedimenting particles is determined according to the method described by W. Scholtan, Kolloid Zeitschrift 250, 782–96, 1972). Always determined is the volume-averaged particle size, namely the average particle diameter as the $D_v50$ number.

This method was not suitable for determining the particle size of the commercially available product Acryloid KM 330, because the particles showed some form of agglomeration. Therefore, the particle size has also been determined in articles formed from the polymer mixture according to the invention and in articles formed from a polymer mixture which comprises the commercial product Acryloid KM 330. Polymer mixtures having 8.5 parts by weight of polymer (c), 40 parts by weight of polybutylene terephtalate, 50 parts by weight of bisphenol-A-polycarbonate, 0.5 part by weight of titanium dioxide, 0.05 part by weight of carbon black and stabilizers were mixed in an extruder at 265° C. The extrudate was granulated. The granulate was injection moulded. The resulting articles were fractured at −196° C. The particles of polymer (c) were made visible in the fracture surface by means of a scanning electron microscope. The average diameter of 100 particles is indicated below as the "s.e.m. value". Generally a smaller value for the diameter is found with this method as compared with the above-described method.

A polymer (c) having a particle size of less than 0.2 micrometers can be prepared according to known methods. A suitable method of preparation is indicated (1st polymer c).

The invention is based on the discovery that polymer mixtures which comprise an aromatic polycarbonate, an aromatic polyester, and a polymer (c) having a particle size of less than 0.2 micrometers, have no nacrous lustre and show no white spots when in contact with organic solvents. Polymer mixtures comprising an aromatic polycarbonate and a polymer (c) having a particle size smaller than 0.2 micrometers, and polymer mixtures comprising an aromatic polyester and a polymer (c) having a particle size of smaller than 0.2 micrometers will show a similar improvement of properties as compared with similar polymer mixtures comprising the known Acryloid KM 330 having a particle size of 0.46 micrometers (s.e.m. value).

In the polymer mixture according to the invention a polymer (c) is preferably used having a comparatively high degree of cross-linking corresponding to a degree of swelling of less than 7 g per gram (determined in the manner described hereinafter).

The commercially available polymer (c) (KM 330) has a degree of swelling of 5 g per gram. Application of a polymer (c) having a degree of swelling of less than 7 g per gram leads to a polymer mixture having a reduced nacrous lustre (for the same particle size).

The polymer mixture according to the invention comprises, in addition to the polymer (c), an aromatic polycarbonate and an aromatic polyester.

Aromatic polycarbonates are compounds known per se. Suitable aromatic polycarbonates are described, for example, in U.S. Pat. No. 4,034,016. Particularly suitable are the polycarbonates comprising units derived from bisphenol A and/or tetramethyl bisphenol A. It is also possible to use so-called branched polycarbonates.

Aromatic polyesters are compounds also known per se. The so-called polyalkylene terephtalates, for example, polyethylene terephthalate and polybutylene terephtalate, are particularly suitable. The aromatic polyesters are prepared by reaction of one or more aromatic dicarboxylic acids, for example terephthalic acid, esters or ester-forming derivatives thereof, with one or more different diol compounds. Suitable diol compounds are ethylene glycol, 1,4-butanediol and 1,6-hexane diol. A part of the aromatic dicarboxylic acid may be replaced by an aliphatic dicarboxylic acid. Mixtures of one or more polyesters are also suitable.

The polymer mixtures according to the invention can be obtained according to the usual method of preparing polymer mixtures. The polymer mixtures according to the invention are conventionally prepared by mixing the constituents (a), (b), and (c) in an extruder and extruding them. The extrudate is then granulated.

The polymer mixtures according to the invention can be formed into articles by means of the shaping techniques for thermoplastic materials, in particular by injection moulding.

The polymer mixtures may furthermore comprise the conventional additives, for example, fillers, for example, in the form of reinforcing fibres, stabilizers, dyes, flame-retarding agents, softeners, mould-detaching agents, seed-forming agents, and the like.

The preparation of 1st polymer (c):

1.0 Polymer (c) having a particle size of smaller than 0.2 micrometers.

1.1. The following solutions were prepared:

A 506.9 parts by weight of n-butylacrylate
2.6 parts by weight of allylmethacrylate
2.6 parts by weight of tris(2-acrylyloxy-ethyl) isocyanurate (FA 731 A van Hitachi)

B 6.4 parts by weight of sodium (n-dodecyl benzene sulphonate)
530 parts by weight of demineralized water

C 1.6 parts by weight of $K_2S_2O_8$ (potassium peroxydisulphate)
120 parts by weight of demineralized water

D 1.6 parts by weight of $Na_2S_2O_5$ (sodium disulphite)
120 parts by weight of demineralized water A glass two liter reactor was filled with A and B, cooled to 10° C. and made oxygen-free by rinsing-/evacuating five times with nitrogen. The mixture of A and B was emulsified by stirring. The temperature was then raised to 40° C. 60 Parts by weight of solution C (deaerated) were then injected, succeeded by 60 parts by weight of solution D (deaerated). The polymerisation reaction started immediately, which resulted in a rise in temperature to 70°–75° C. in 10 minutes: the temperature was then adjusted at 60° C. and the pressure at 1.5 atmospheres. The remainders of solutions C and D (deaerated) were gradually added in a period of 2 hours by means of dosing pumps. Stirring for another hour at 60° C. was then carried out to complete the reaction.

1.2. The following solutions were prepared and deaerated:

E 127.4 parts by weight of methylmethacrylate
0.6 parts by weight of allylmethacrylate

F 1.6 parts by weight of sodium (n-dodecyl benzene sulphonate)
0.4 parts by weight of $K_2S_2O_8$ (potassium peroxydisulphate)
100 parts by weight of demineralized water

G 0.4 parts by weight of $Na_2S_2O_5$ (sodium disulphite)
100 parts by weight of demineralized water The solutions E, F and G were gradually added to the reaction mixture obtained sub 1.1. while stirring over a period of 1 hour. The reaction was then continued for 30 minutes at 85° C. The particle size of the latex thus obtained was determined as indicated above.

1.3. The resulting latex was destabilized by pouring the contents of the reactor through a filter into a rapidly stirred aqueous solution with 1% by weight of $CaCl_2$. The precipitated polymer (c) was isolated by filtration, washed with water, and dried in a vacuum at 60° C.

The particle size was 0.17 micrometer.

2nd. Polymer (c) having a particle size of more than 0.2 micrometer (0.32 micrometer):

A two-liter glass reactor was filled, while stirring with 500 parts by weight of water, after which 160 parts by weight of a latex prepared as indicated sub 1.1. were added. The reactor with contents was made oxygen-free by rinsing/evacuating five times with nitrogen. The assembly was heated to a temperature of 60° C. under a pressure of 1.5 atmospheres. Deaerated solutions A to D as described sub 1.1. were gradually added in a period of three hours. The temperature rose to 62°–63° C. Finally, stirring was carried out for another 90 minutes at 60° C.

2.2. As indicated sub 1.2.
2.3. As indicated sub 1.3.

3rd. Polymer (c) having a particle size of more than 0.2 micrometers (0.61 micrometers):

3.1. The method described sub 2.1. was repeated, the starting-material, however, being an initial batch of 400 parts by weight of water and 30 parts by weight of latex obtained according to 1.1.

3.2. As indicated sub 1.2.
3.3. As indicated sub 1.3.

4th, 5th, 6th Polymer (c):

The methods as described for the 1st, 2nd and 3rd, polymer (c), respectively, were repeated, a solution A being used, however, consisting of 499.2 parts by weight of n-butyl acrylate, 2.56 parts by weight of allyl methacrylate and 10.24 parts by weight of tris (2-acrylyloxy-ethyl) isocyanurate.

7th, 8th, 9th Polymer (c):

The methods as described for the 1st, 2nd and 3rd polymer (c), respectively, were repeated, a solution A being used, however, consisting of 488.96 parts by weight of n-butylacrylate, 2.56 parts by weight of allylmethacrylate, and 20.48 parts by weight of tris(2-acrylyloxy-ethyl) isocyanurate.

Of the resulting polymers (c) 1 to 9, the average particle diameter ($D_v50$) was determined, as well as the degree of swelling and the gel content (gel fraction). For determining the degree of swelling and the gel fraction, a given quantity of polymer (c) was weighed (A). This quantity was suspended in toluene at room temperature in a concentration of 1.5% by weight and kept in suspension for 4 hours. The suspension was then centrifuged (28000 G), the supernatant clear liquid was decanted, the resulting gel was mixed with fresh toluene and again centrifuged. The supernatant clear liquid was again decanted. The weight of the remaining gel was determined (B). The remaining gel was then dried to constant weight (C). The degree of swelling (ZG) is the ratio between B and C; the gel fraction (GF) is calculated from $C/A \times 100\%$ The results obtained are recorded in Table A hereinafter

TABLE A

| Polymer (c) no. | Average particle size $D_v50$ (micrometers) | ZG (g/g) | GF (wt. %) |
|---|---|---|---|
| 1 | 0.17 | 11.7 | 94.3 |
| 2 | 0.32 | 9.5 | 95.5 |
| 3 | 0.61 | 8.8 | 95.1 |
| 4 | 0.18 | 7.9 | 96.2 |
| 5 | 0.34 | 6.5 | 95.2 |
| 6 | 0.57 | 5.5 | 95.0 |
| 7 | 0.16 | 5.7 | 94.9 |
| 8 | 0.30 | 5.4 | 96.6 |
| 9 | 0.52 | 5.2 | 96.1 |

The polymers (c) Nos. 1, 4 and 7 are suitable for the polymer mixtures according to the invention; the polymers (c) Nos. 2, 3, 5, 6, 8, and 9 have been used for comparative examples.

EXAMPLE I 8.5 Parts by weight of always one of the polymers (c) 1 to 9 were mixed in an extruder at 265° C. with parts by weight of polybutylene terephtalate (melting index according to ISO 1133 at 250° C., 50 N=24 g per 10 minutes), 50 parts by weight of polycarbonate derived from bisphenol A (melting index according to ISO 1133 at 300° C., 12 N=11 g per 10 minutes), 0.5 parts by weight of titanium dioxide, 0.05 parts by weight of carbon black and stabilizers. The extrudate was granulated. The granulate was formed into test bars by injection moulding. Two further polymer mixtures were also prepared: one without polymer (c) and one with 8.5 parts by weight of the commercially available Acryloid KM 330.

The melting index (MFI) according to ISO 1133 was determined of the resulting granulates as well as of the starting polymers. The notch impact strength at −15°

C. was determined according to ASTM D 256 (bar thickness 3.2 mm). The discoloring (turning white) of the surface and nacrous lustre effects were determined in plates having a dimension of 6×6 cm.

The turning white was measured as follows. The plates were immersed for 6 minutes in a mixture of 85% by volume of "Fuel C" (according to ISO 1817) and 15% by volume of methanol. The plates were then dried in air for 24 hours. The discoloring was measured with a Zeiss RFC 3 spectrophotometer and calculated according to DIN 6174. The turning white is quantified by the $\Delta L^*_{ab}$ contribution expressed in so-called Cielab units. A low absolute $\Delta L^*_{ab}$ value indicates a small extent of turning white, a high $\Delta L^*_{ab}$ value a high extent of turning white. The nacrous lustre effects are evaluated visually by inspecting the plates at different angles and under different light sources and paying attention to changes in colour. When no changes in colour occurred (i.e. no nacrous lustre), an evaluation 5 was given; strong change in colour is evaluated by numeral 1.

The particle size of polymer (c) in the polymer mixture is determined in the manner as described hereinbefore by means of a scanning electron microscope.

The results are recorded in Table B hereinafter.

TABLE B

| Polymer mixture with polymer (c) No. | s.e.m. particle size (micrometers) | Melting index (g/10 minutes) | Notch impact strength at −15° C. (J/m) | $\Delta L^*_{ab}$ (Cielab-units) | Nacrous lustre |
|---|---|---|---|---|---|
| 1 | 0.13 | 13.0 | 740 | 4.1 | 4 |
| 2 | 0.28 | 13.0 | 686 | 10.0 | 3 |
| 3 | 0.37 | 11.2 | 683 | 13.5 | 1 |
| 4 | 0.13 | 13.7 | 613 | 5.1 | 4 |
| 5 | 0.30 | 13.0 | 590 | 9.5 | 3 |
| 6 | 0.37 | 12.9 | 542 | 11.9 | 2 |
| 7 | 0.12 | 13.7 | 573 | 6.8 | 5 |
| 8 | 0.26 | 12.9 | 525 | 9.1 | 4 |
| 9 | 0.38 | 11.0 | 480 | 10.1 | 3 |
| None | — | 16.8 | 100 | 0.2 | 5 |
| KM 330 | 0.46 | 13.3 | 580 | 12.7 | 1 |

It may be seen from Table B that the polymer mixtures comprising the polymers (c) Nos. 1, 4, and 7 show the most favourable combination of little turning white and no or little nacrous lustre effects. Comparison of the polymer composition comprising polymer (c) No. 7 with the compositions containing polymer (c) No. 4 and No. 1 shows that polymer (c) No. 7 leads to a smaller nacrous lustre effect. The most important difference between polymers (c) Nos. 1, 4, and 7 is the degree of swelling (see Table A); polymer (c) No. 7 has the lowest degree of swelling. On the basis of this result, a polymer (c) is to be preferred having a low degree of swelling of less than 7 g per g. The effect of the degree of swelling on the nacrous lustre appears even more significant when the polymer mixtures with a polymer (c) Nos. 9, 6, and 4 are compared mutually. The use of polymer (c) with the lowest degree of swelling leads to the best evaluation for the nacrous lustre.

EXAMPLE II

In a manner comparable to that described hereinbefore for the 4th polymer (c), a polymer (c) was prepared in which 2-ethylhexylacrylate was used instead of n-butylacrylate.

The average particle size (s.e.m. diameter value) of this polymer (c) in the fracture surface of a polymer mixture according to the invention (prepared as described in Example I with the above-meant polymer (c) based on ethylhexylacrylate) was 0.14 micrometers.

The melting index of the polymer mixture was 14.0 g/min. The notch impact strenght at −15° C.: 605 J/m. The nacrous lustre was evaluated by the numeral 4 and the $\Delta L^*_{ab}$ value was only 0.5 Cielab units.

EXAMPLE III

A polymer (c) was prepared in a manner similar to that described in Example II (i.e. elastomeric phase from 2-ethylhexylacrylate), in which the last phase was not copolymerized from methylmethacrylate but from a mixture of styrene and acrylonitrile (weight ratio respectively 71:29).

The average particle size (s.e.m. diameter value) of the resulting polymer (c) in a polymer mixture according to Example I with this polymer (c) was 0.12 micrometer. The polymer mixture had a melting index of 16 g per 10 minutes, a notch impact strength at −15° C. of 580 J/m, a nacrous lustre value 4 and a $\Delta L^*_{ab}$ value of 1.0 Cielab unit.

EXAMPLE IV

A second portion of polymer (c) no. 7 as referred to on pages 12 and 13 hereabove was prepared. The average particle size was 0.17 micrometers, the degree of swelling 5.9 g/g and the gelfraction 95.0% by weight.

8.5 Parts by weight of the above-mentioned polymer (c) were admixed with 90.95 parts by weight of the same polycarbonate as mentioned hereabove (page 14, line 1), 0.5 parts by weight of titanium dioxide, 0.05 parts by weight of carbon black and stabilizers.

As comparison a similar blend was prepared by using 8.5 parts by weight of the commercially available KM 330 instead of the polymer (c) no. 7.

By testing the obtained materials the following results have been obtained (Table C).

TABLE C

| Polymer mixture with polymer (c) | Melting index (g/10 minutes) | Notched impact strength at −15° C. (J/m) | $\Delta L^*_{ab}$ (Cielab units) | Nacrous lustre |
|---|---|---|---|---|
| no. 7 | 7.0 | 681 | 8.4 | 4 |
| KM 330 | 6.7 | 650 | 23.2 | 3 |

As can be seen from the above Table C the blend according to the invention with polymer (c) no. 7 shows superior L values and has a smaller nacrous lustre.

We claim:
1. A polymer mixture which comprises the following constituents:
(a) 30–70% by weight of aromatic polycarbonate;
(b) 20–60% by weight of aromatic polyester;

(c) 5–15% by weight of a polymer having an elastomeric core from one or more alkyl acrylates or aralkyl acrylates, a cross-linking agent and a grafting agent and a rigid thermoplastic envelope,
characterized in that the polymer (c) has an average particle size of less than 0.2 micrometers.

2. A polymer mixture as claimed in claim 1, characterized in that the polymer (c) has a degree of swelling of less than 7 g per g.

3. A polymer mixture as claimed in claim 1, characterized in that the polymer mixture comprises
(a) 40–60% by weight of aromatic polycarbonate;
(b) 30–50% by weight of aromatic polyester;
(c) 8–12% by weight of the polymer (c).

4. A polymer mixture as claimed in claim 1, characterized in that the polymer (c) has an elastomeric core which comprises ethylhexylacrylate.

5. A polymer mixture which comprises
(a) 85–99.5% by weight of aromatic polycarbonate, and
(b) 0.5–15% by weight of a polymer (c) as claimed in claim 1.

6. A polymer mixture which comprises
(a) 85–99.5% by weight of aromatic polyester and
(b) 0.5–15% by weight of a polymer (c) as claimed in claim 1.

* * * * *